United States Patent
Han et al.

(10) Patent No.: US 9,986,576 B2
(45) Date of Patent: *May 29, 2018

(54) STEERING CONNECTION REQUESTS FOR AN ACCESS POINT TO A BEST-SERVING ACCESS POINT

(71) Applicant: Fortinet, Inc., Sunnyvale, CA (US)

(72) Inventors: Sung-Wook Han, Sunnyvale, CA (US); Mohan Ram, Banashankari (IN)

(73) Assignee: Fortinet, INC, Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/266,306

(22) Filed: Sep. 15, 2016

(65) Prior Publication Data
US 2017/0071006 A1  Mar. 9, 2017

Related U.S. Application Data

(63) Continuation of application No. 14/727,868, filed on Jun. 2, 2015, now Pat. No. 9,538,460, which is a continuation of application No. 13/746,289, filed on Jan. 21, 2013, now Pat. No. 9,078,198.

(51) Int. Cl.
| | |
|---|---|
| *H04L 12/26* | (2006.01) |
| *H04W 72/08* | (2009.01) |
| *H04W 48/16* | (2009.01) |
| *H04W 76/02* | (2009.01) |
| *H04W 4/06* | (2009.01) |
| *H04W 24/08* | (2009.01) |
| *H04W 48/14* | (2009.01) |
| *H04W 84/12* | (2009.01) |

(52) U.S. Cl.
CPC .......... *H04W 72/085* (2013.01); *H04W 4/06* (2013.01); *H04W 24/08* (2013.01); *H04W 48/16* (2013.01); *H04W 76/02* (2013.01); *H04W 48/14* (2013.01); *H04W 84/12* (2013.01)

(58) Field of Classification Search
CPC ...... H04W 28/08; H04W 48/16; H04W 84/12
See application file for complete search history.

(56) References Cited

U.S. PATENT DOCUMENTS

| | | | |
|---|---|---|---|
| 7,797,016 | B2 | 9/2010 | Eran et al. |
| 9,078,198 | B2 | 7/2015 | Han |
| 9,538,460 | B2 * | 1/2017 | Han ...................... H04W 48/16 |
| 2002/0013864 | A1 * | 1/2002 | Dandrea ............... G06F 3/0613 |
| | | | 710/6 |
| 2002/0181417 | A1 | 12/2002 | Malhotra |
| 2005/0053043 | A1 | 3/2005 | Rudolf |
| 2007/0275746 | A1 * | 11/2007 | Bitran ............... H04W 72/0446 |
| | | | 455/509 |
| 2008/0146240 | A1 | 6/2008 | Trudeau |
| 2008/0170497 | A1 | 7/2008 | Jeong |
| 2013/0294232 | A1 | 11/2013 | Segev et al. |

* cited by examiner

*Primary Examiner* — Kevin C Harper
(74) *Attorney, Agent, or Firm* — Law Office of Dorian Cartwright; Dorian Cartwright

(57) ABSTRACT

Network devices are steered to preferred access points using a probability function. A probe request for connection is received from a network device. The probe request can be from a network device attempting to use a wireless network (e.g., a IEEE 802.11-type network or other suitable type of network). A probability function that defines a likelihood of granting the network device a connection is used to determine whether to accept or deny the response. The probe response is then sent to the network device.

17 Claims, 7 Drawing Sheets

STEERING CONNECTION REQUESTS FOR AN ACCESS POINT TO A BEST-SERVING ACCESS POINT

CROSS-REFERENCE TO RELATED APPLICATIONS

This application is a continuation of U.S. patent application Ser. No. 14/727,868, filed Jun. 2, 2015, entitled STEERING CONNECTION REQUESTS FOR AN ACCESS POINT TO A BEST-SERVING ACCESS POINT, which is a continuation of U.S. patent application Ser. No. 13/746,289, entitled DISTRIBUTED CLIENT STEERING ALGORITHM TO A BEST-SERVING ACCESS POINT by Sung-Wook HAN et al. and filed on Jan. 21, 2013, the content of which is incorporated herein by reference in its entirety.

FIELD OF THE INVENTION

The invention relates generally to computer networking, and more specifically, to steering network devices to connect with preferred access points using probability functions.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

Wireless devices complying with standards such as IEEE 802.11 have control over how a connection to a wireless network is made. Namely, a wireless device selects an access point among a number of access points within range that have sent out beacons advertising a presence. The beacon includes a BSSID (Basic Service Set IDentifier) as an identifier of the access point. In turn, the wireless device sends data packets which include the BSSID of the intended access point. Access points receiving a transmission intended for a different access point, as determined by the BSSID, merely ignore the data packets.

Problematically, wireless devices act in self-interest and without consideration for burdens or capabilities of an access point or other components in a wireless network, or other conditions affecting the wireless network. In fact, wireless devices, being unaware of network conditions, can also make a connection against their own best interest when a more capable access point is within range and available. Ultimately, the lack of information given to a decision-making device is an inherent weakness of IEEE 802.11 and other network protocols.

A client running on a wireless device is not always a desirable solution. For instance, guests connecting to a public hot spot for only one time would be burdened with the process of downloading and installing a client. Furthermore, many computer users are weary about malicious applications downloaded from the Internet. Finally, the client is another background process consuming processing and memory availability of wireless devices.

What is needed is a technique to steer network devices to connect with preferred access points. Further, the technique should be adaptable to make independently-behaving access points make connection decisions that benefit the network as a whole.

SUMMARY

To meet the above-described needs, methods, computer program products, and systems are described herein to steer network devices to preferred access points using a connection-accept probability function.

A probe request for connection is received from a network device. The probe request can be from a network device attempting to use a wireless network (e.g., a IEEE 802.11-type network or other suitable type of network). A probability function that defines a likelihood of granting the network device a connection is used to determine whether to respond to the request or not. If the probability function grants a connection, the probe response is then sent to the network device. The higher the grant probability is, the more likely the connection-requesting client gets connected.

The probability function is based on at least one of local conditions and network device conditions. In some embodiments, system-wide conditions are also taken into account. Moreover, a probability function can be bypassed, or progressively adjusted, as the same network device continues to make connection attempts.

Advantageously, a wireless network can improve performance by spreading the burdens across components based on availability. Moreover, no configuration is needed on a network device (e.g., downloading a client).

BRIEF DESCRIPTION OF THE DRAWINGS

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems to steer network devices to preferred access points using a probability function of each of the access points without system-wide central coordination. In other words, each access point makes its own decision on whether it grants a new station's connection or not. Generally, a probability function (or grant profile, or probability profile) defines the likelihood that a connection-requesting client gets connected. For example, grant probability can decrease as network conditions become harsher. In another example, grant probability can increase for authorized devices relative to guest devices. Asserting control over network devices is particularly valuable for wireless networks such as IEEE 802.11-type networks (e.g., 802.11a, 802.11b, 802.11g, 802.11n, 802.11ac, or other IEEE, non-IEEE or custom protocols) which inherently grant connectively selection (i.e., selection of an access point) to network devices.

Figure 1A:
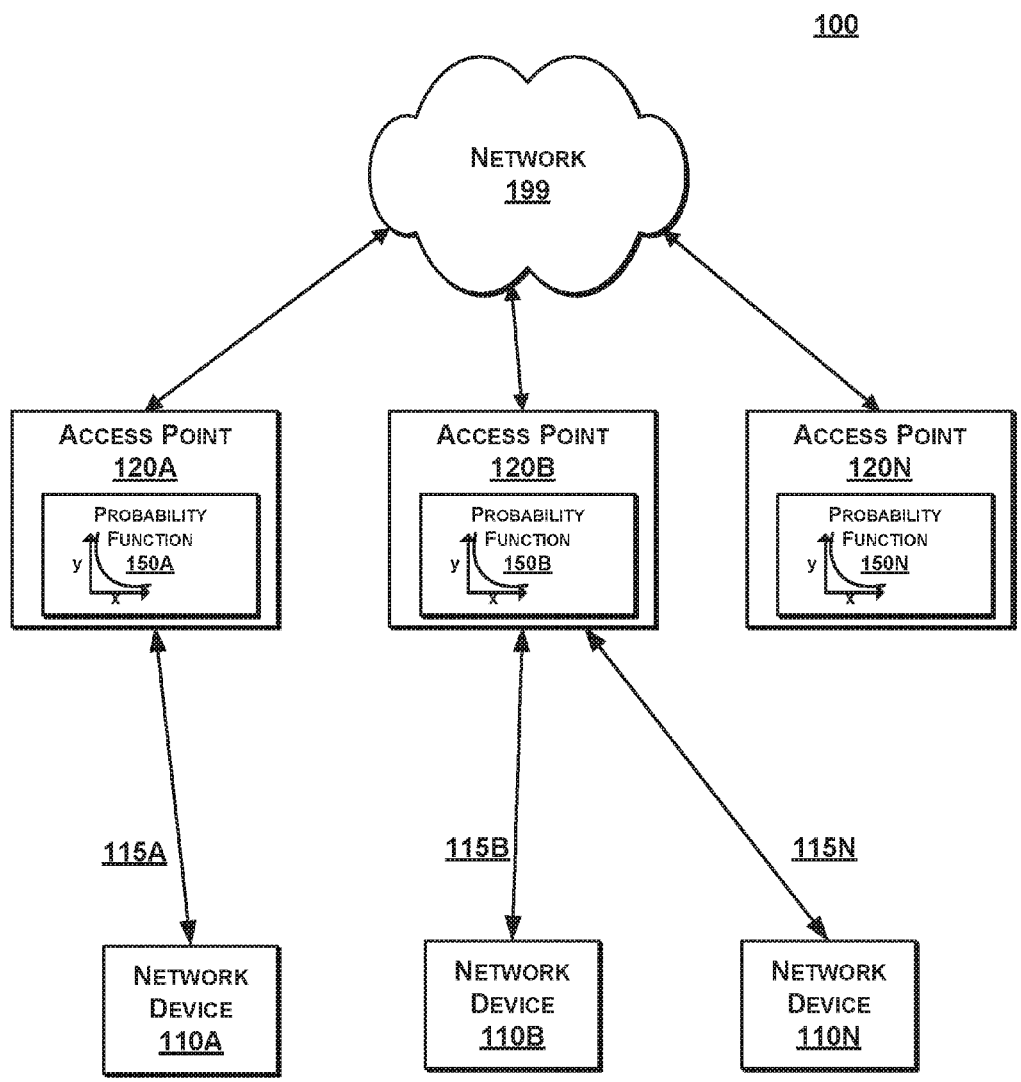
FIG. 1A is a high-level block diagram illustrating a distributed system to steer network devices using probability functions, according to one embodiment.
Figure 1B:
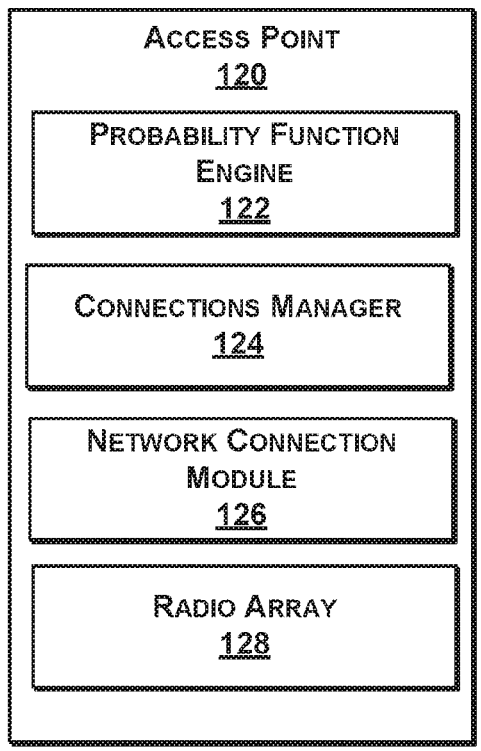
FIG. 1B is a more detailed block diagram illustrating a network device of the system of FIG. 1A, according to one embodiment.
Figure 1C:
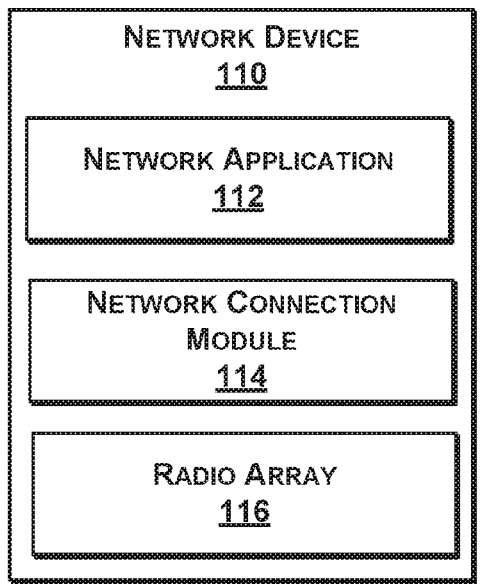
FIG. 1C is a more detailed block diagram illustrating an access point of the system of FIG. 1A, according to one embodiment.

Systems to Steer Network Device Connections (FIGS. 1A-1C)

FIG. 1A is a high-level block diagram illustrating a system 100 to steer network devices using probability functions, according to one embodiment. The system 100 includes access points 120A-N coupled 115A-N to network devices 110A-N and also coupled to a network 199 (e.g., a LAN, WAN, the Internet, a cloud-based network, a data network, a cellular network, a hybrid network, or the like). The system 100 of FIG. 1A distributes implementation of probability functions to access points 120A-N. In alternate implementations, a central controller can contribute to probability functions. In operation, network devices 110A-N probe one of the access points 120A-N, for a connection to a wireless network (e.g., through a gateway), which steer the access points in accordance with the probability functions.

The access points 120A-N include one or more individual access points that interact with network devices 110A-N to control medium access. An individual access point can be any of the computing devices described herein (also see generally, FIG. 6). For example, the access points 120A-N can be an AP 110 or AP 433 (modified as discussed herein) by Meru Networks of Sunnyvale, Calif. Each access point 110A-N is preferably connected to the network 199 (e.g., gateway, switch, router, hub, or another access point that is connected to the network 199) via a wired connection, but in some embodiments, such as a mesh network, the uplink connection is wireless. The access points 120A-N can be set-up in various configurations to provide wireless coverage areas. In another embodiment, the functionality is incorporated into a switch or router. In operation, the access points 120A-N broadcast beacons with a BSSID (Basic Service Set IDentifier) to advertise a presence over a corresponding range. A probe request is received from network devices 110A-N that have selected a particular access point for connection. The access points 120A-N determine a response from a probability function, and send a probe response allowing or refusing the connection.

For example, a number of current connections can be one factor that affects probability functions. In system 100, the access point 120A has one connection, the access point 120B has two connections, and the access point 120N has no connections. As a result, a new network device connection may have the best chance of connecting to the access point 120N, the access point 120A, and then the access point 120B in that order, assuming that all other conditions are equal. From another perspective, out of 100 connection requests, the access point 120N may be likely to accept 95%, the access point 120A may accept 80%, and the access point 120B may accept 43%.

In a sample connection sequence, a new network device attempts connection with the access point 120N and is denied, even though the probability is small. It re-attempts after being denied by the access point 120B, which has a relatively larger probability of denial due to the multiple existing connections. The new network device then returns to the access point 120N for a second request. Besides having an initial low probability of being denied, some embodiments lower the threshold even further upon subsequent requests from the same network device. Therefore, the second request is highly likely to be granted. Of course, numerous other examples and connection sequences are possible.

In FIG. 1A, the access points 120A-N are distributed, and thus, operate in an independent manner. In particular, each access point determines a probability function 150A-C internally. In this case, the probability functions probability function 150A-C serve as a tool to infer conditions around the network. If the same network device continually requests a connection to a particular access point, that access point infers that other access points are also carrying a high capacity. Consequentially, a decentralized system of access points can operate in a coordinate manner without any direct communication with other access points. More detailed embodiments of the access point are set forth below in FIG. 1B.

Figure 6:
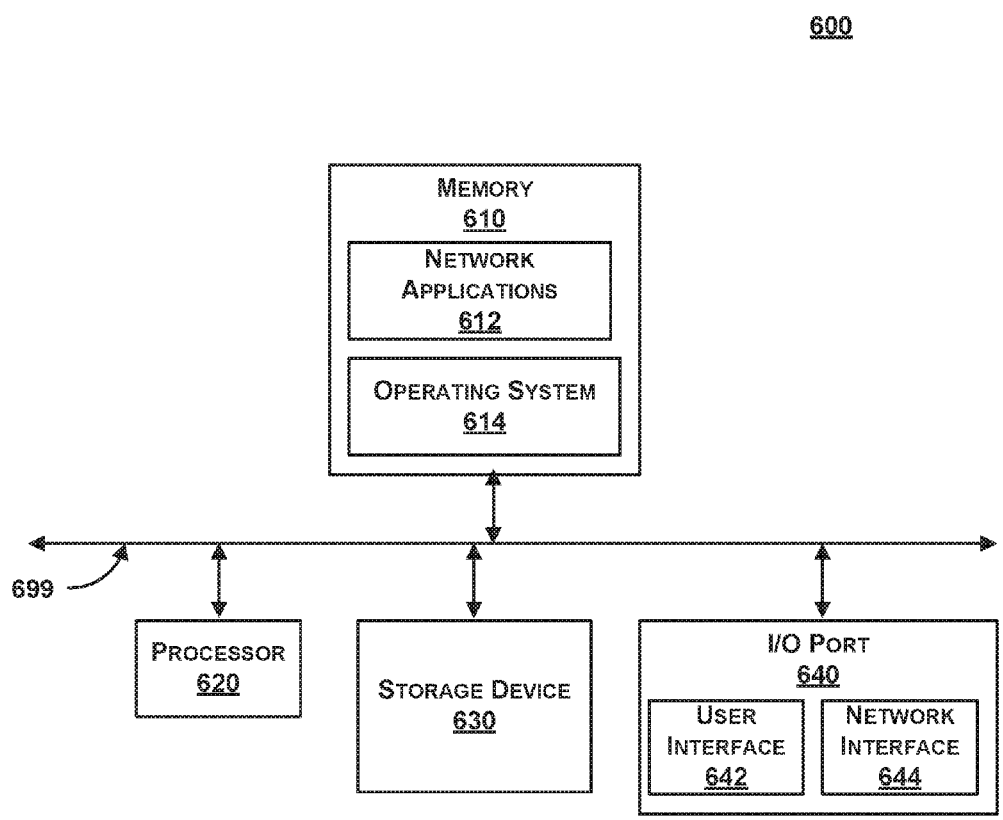
FIG. 6 is a block diagram illustrating an exemplary computing device, according to one embodiment.

The network devices 110A-N can be, for example, a personal computer, a laptop computer, a tablet computer, a smart phone, a mobile computing device, an Internet appliance, a non-wireless device modified to have wireless capabilities, or any other computing device (see generally, FIG. 6). A network device is wirelessly coupled to an access point. No pre-configuration or client is needed, in an embodiment. In an alternative embodiment, the network device participates in probabilistic connections by, for example, having characteristics or behaviors that affect probability functions. The network devices 110A-N operate according to standards in which an access point is selected by the network devices 110A-N themselves (e.g., IEEE 802.11). However, it is the access points 120A-N that directs the network devices 110A-N into selecting an preferred access point. Conditions associated with the network device can affect the preference. For example, an RSSI (Received Signal Strength Indicator), a distance from a particular access point, connection history, a user of the network device, a type of traffic, and the like can cause a network device to be steered away from certain access point and towards others. Embodiments of then network devices 110A-N are discussed in more detail below in association with FIG. 1C.

In an optional embodiment, a controller 110 (e.g., an MC1500 or MC6000 device by Meru Networks of Sunnyvale, Calif. as described in U.S. application Ser. No. 13/426,703 filed Mar. 22, 2012 and commonly-assigned) provides centralized management for access points. As a result, the controller can assist by, for example, providing default probability functions to new access points that join the wireless network, generating updated probability functions, or feeding information to the access points 120A-N to aid local generation of probability functions. Additionally, due to system-wide communication with components, system-wide conditions can be observed and factored into probability functions. The controller can provide many other services to the network 199 such as virtual cell and virtual port functionalities (also described in U.S. application Ser. No. 13/426,703).

FIG. 1B is a more detailed block diagram illustrating an access point 120 of the system 100, according to one embodiment. The access point 120 comprises a probability function engine 122, a connections manager 124, a network module 126, and a radio array 128. The components can be implemented in hardware, software, or a combination of both.

The probability function engine 122 receives, adjusts, and or generates probability functions, depending on the implementation as discussed above in connection with FIG. 1A.

The connections manager 124 maintains a table of connected network devices, along with related states of those network devices, and the like. In one embodiment, the connections manager 124 can also track statistics used for determining probability functions, such as number of connections, loads, throughput, and packet loss.

The network connection module 126 can be similar to the network module 114 of the network device 110 of FIG. 1C. Furthermore, the network module 126 can provide hub, switching, or routing functionality depending on a network configurations. For example, data packets sent over an uplink from a network device can be forwarded to the Internet. Also, control packets can be received from a controller.

The radio array 128 can be similar to the radio array 116 of the network device 110 of FIG. 1C.

FIG. 1C is a more detailed block diagram illustrating a network device of the system 100, according to one embodiment. The network device 110 comprises a network application 112, a network connection module 114, and a radio array 116. The components can be implemented in hardware, software, or a combination of both.

The network application 112 can be any application executing on the network device 110 that makes use of network access in operation. Examples of the network application 112 include a network browser, a VOIP telephone service, a streaming video player, a database viewer, a VPN client, and the like.

The network connection module 114 is responsible for connecting to a communication channel for data exchange. To do so, the network communication module 114 listens for beacons broadcast by access points, and generates a probe request to connect to a selected access point. After connecting, the network connection module 114 exchanges data packets and unpacks data packets in accordance with, e.g., a TCP/IP stack. More particularly, IEEE 802.11-type packets can be generated and received.

The radio array 116 includes one or more transmit (Tx) and receive (Rx) antennas for communication with the physical layer. Some network devices 110 include separate antennae for IEEE 802.11a, IEEE 802.11b and IEEE 802.11n. Other network devices 110 includes several antenna dedicated for separate transmit and receive paths using the MIMO functionality of IEEE 802.11n.

Methods for Steering Network Device Connections (FIGS. 2-5)

Figure 2:
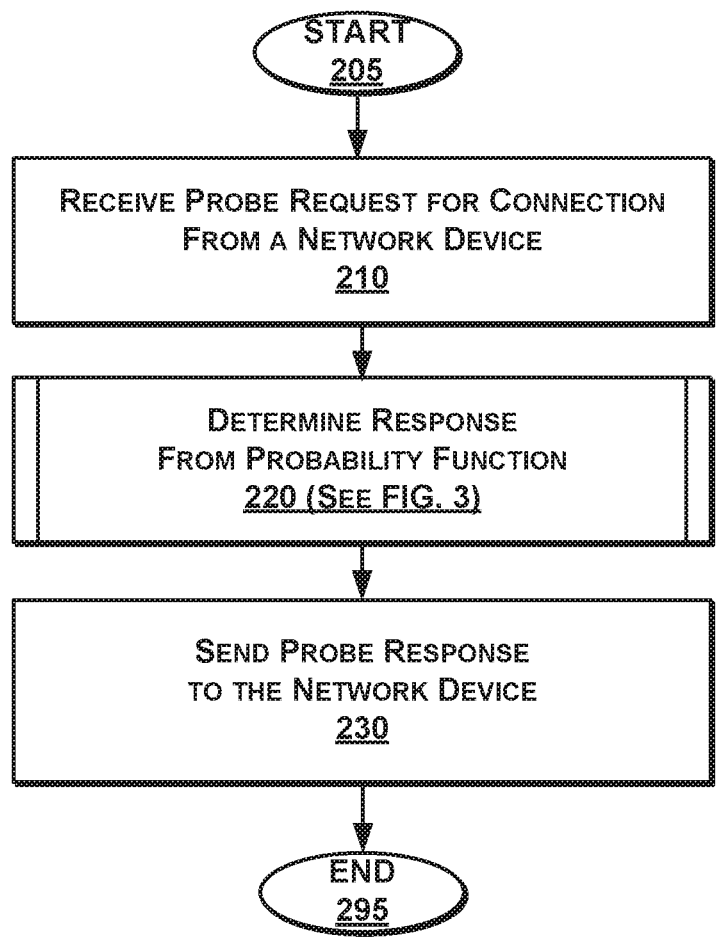
FIG. 2 is a block diagram illustrating a method for steering network devices using probability functions, according to one embodiment.

FIG. 2 is a block diagram illustrating a method 200 for steering network devices using probability functions, according to one embodiment. Although new connections are discussed herein as triggering network steering of a network device, existing connections can be steered as well. For instance, an existing connection can be terminated in an overburdened access point with the intention of steering the terminated network device towards a less burdened access point. Also, a probability function can be completely or partially revised for subsequent connection requests.

At step 210, a probe request for connection is received from a network device. The probe request can include information, such as a BSSID and other information gathered from a beacon previously sent by an access point. The probe request also identifies a network device so that the access point would be able to identify subsequent communications.

At step 220, a response is determined from a probability function. At a high-level, one or more conditions are taken into account. Conditions can be dynamic (e.g., current amount of network bandwidth, RSSI or non Wi-Fi interference noise level) or static (access point hardware or OS version, band preference such as IEEE 802.11a over IEEE 802.11 b or g). In one aspect, system-wide conditions, such as total number of connections, router or switch loads, time of day, day of week, and spectrum usage or capacity, allows a controller or cooperating access points to react to broad conditions. In another aspect, access point conditions, such as number of connections, processing load, memory or cache availability, and current packet loss, allow an access point to act more selfishly in protecting itself from overloading. In still another aspect, network device conditions, such as RSSI, flight time of packets, number of connection requests, device user, and connection history, are rebuttals that distinguish the needs of one network device in comparison to others. An example of step 220 is discussed below with respect to FIG. 3.

In step 230, a probe response is sent to the network device. Based on results of applying conditions probability functions, a response is generated. A decision to deny can result in ignoring the request, or a packet being sent back with the denial. A connected device can begin wireless communication. Meanwhile, rejected device can attempt to connect with another access point or make additional requests to the same access point until successful.

Figure 3:
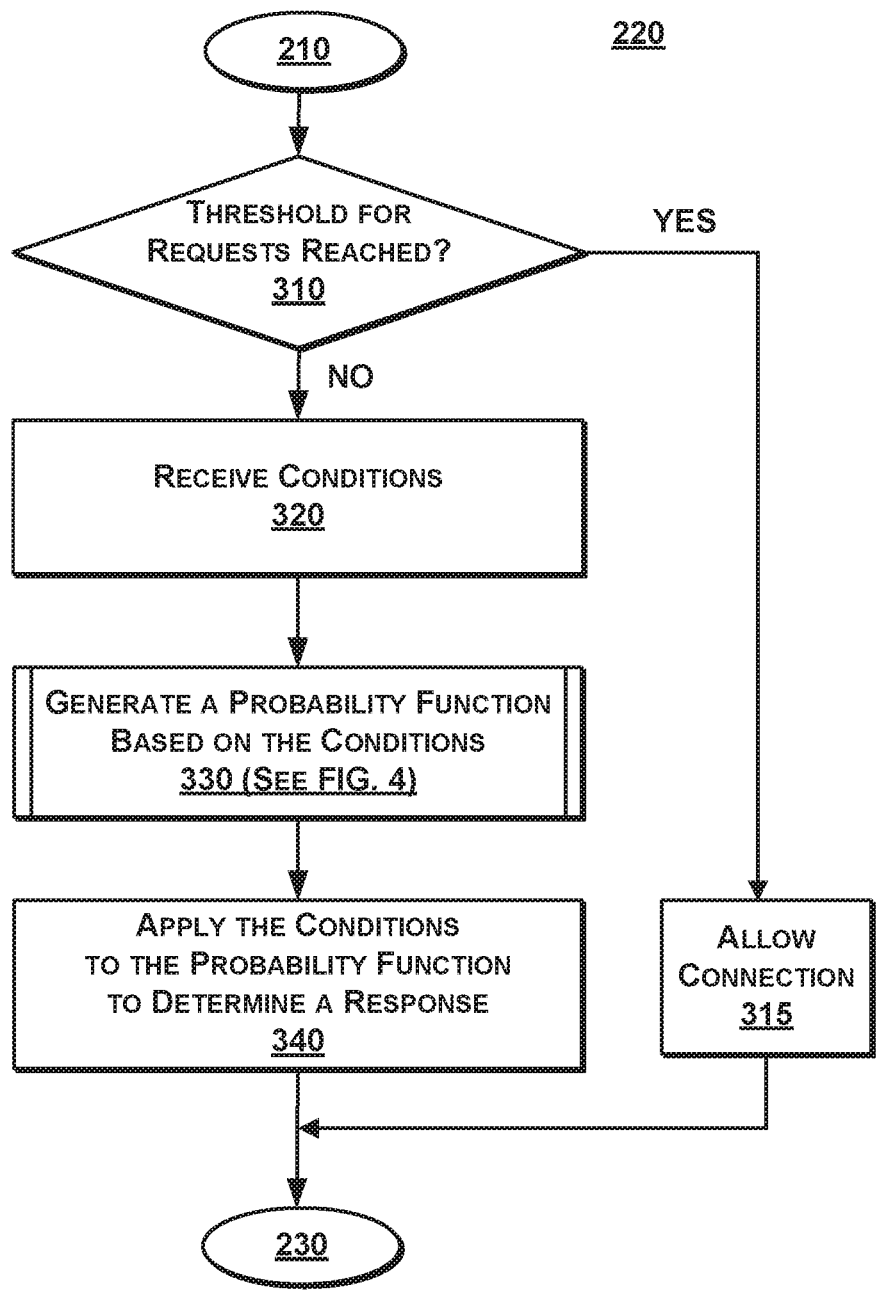
FIG. 3 is a block diagram illustrating a method for determining a response from a probability function, from the method of FIG. 2, according to one embodiment.

FIG. 3 is a block diagram illustrating a method 300 for determining a response from a probability function, according to one embodiment. At step 310, if a threshold for a number of requests is reached, for example, from a particular network device over a period of time, the decision processed is bypassed to allow a connection 315. Other factors can also trigger the bypass, such as a connection history that indicates a network device or user is critical to an entity (e.g., highly-available server, user that is executive at company). In some implementations, the threshold bypass is not available.

At step 310, if a threshold for a number of requests has not yet been reached, conditions are received from one or more of a controller, associated access points, and network devices at step 320. The conditions can vary widely and be weighted in accordance with individual network implementations. For system-wide conditions, sensors around a network, diagnostic applications, operating systems, system logs, and other components can provide relevant information. For access point and network device conditions, a client can send information to a controller over the network intermittently, or responsive to status checks. Additionally, an operating system can provide internal information relating to current processing, memory and cache loads.

At step 330, a probability function is generated based on the conditions. The probability function can be a single probability curve or a set of curves. Generally, a probability curve (or probability mass, probability density, or probability density) is a function describing the probability of a random variable taking certain values. The conditions are random variables. The probability curve can be continuous, discrete, or both. Generation can occur once until manually changed, over predetermined intervals, or on-the-fly upon each connection request. Additional embodiments for function generations are detailed below in association with FIG. 4.

At step 340, the conditions are applied to the probability function to determine a response. The conditions supply one or more variables plugged into a formula that represents the probability function. Also, the conditions can filter a set of curves down to a single probability function. The probability function yields a single value from 0 to 1.0 representing a percentage. A set of 100 requests applied to a value of 0.50 converges upon 50 acceptances and 50 denials (i.e., 50% acceptance rate). Likewise, 100 requests applied to a value of 0.75 converges upon 75 acceptances and 25 denials (i.e., 75% acceptance rate).

Figure 4:
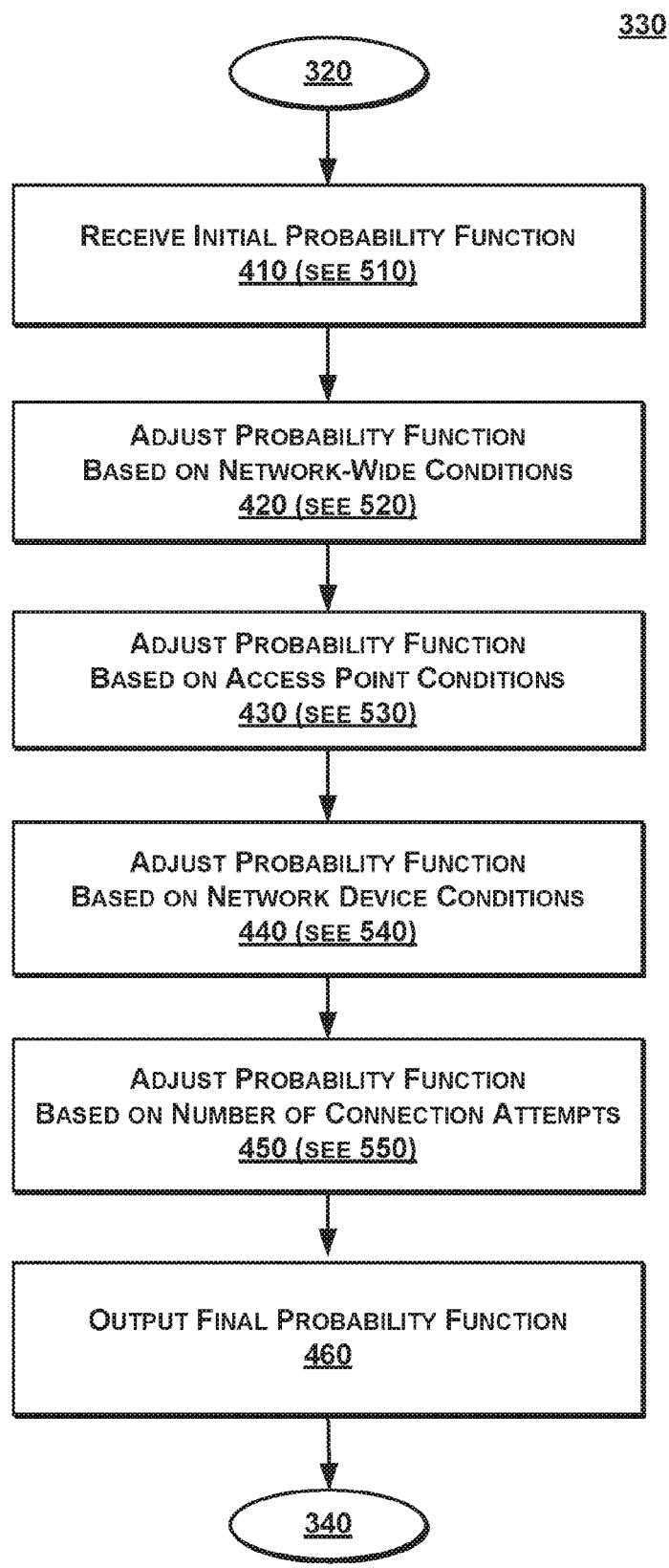
FIG. 4 is a block diagram illustrating a method for generating the probability function based on conditions, from the method of FIG. 3, according to one embodiment.
Figure 5:
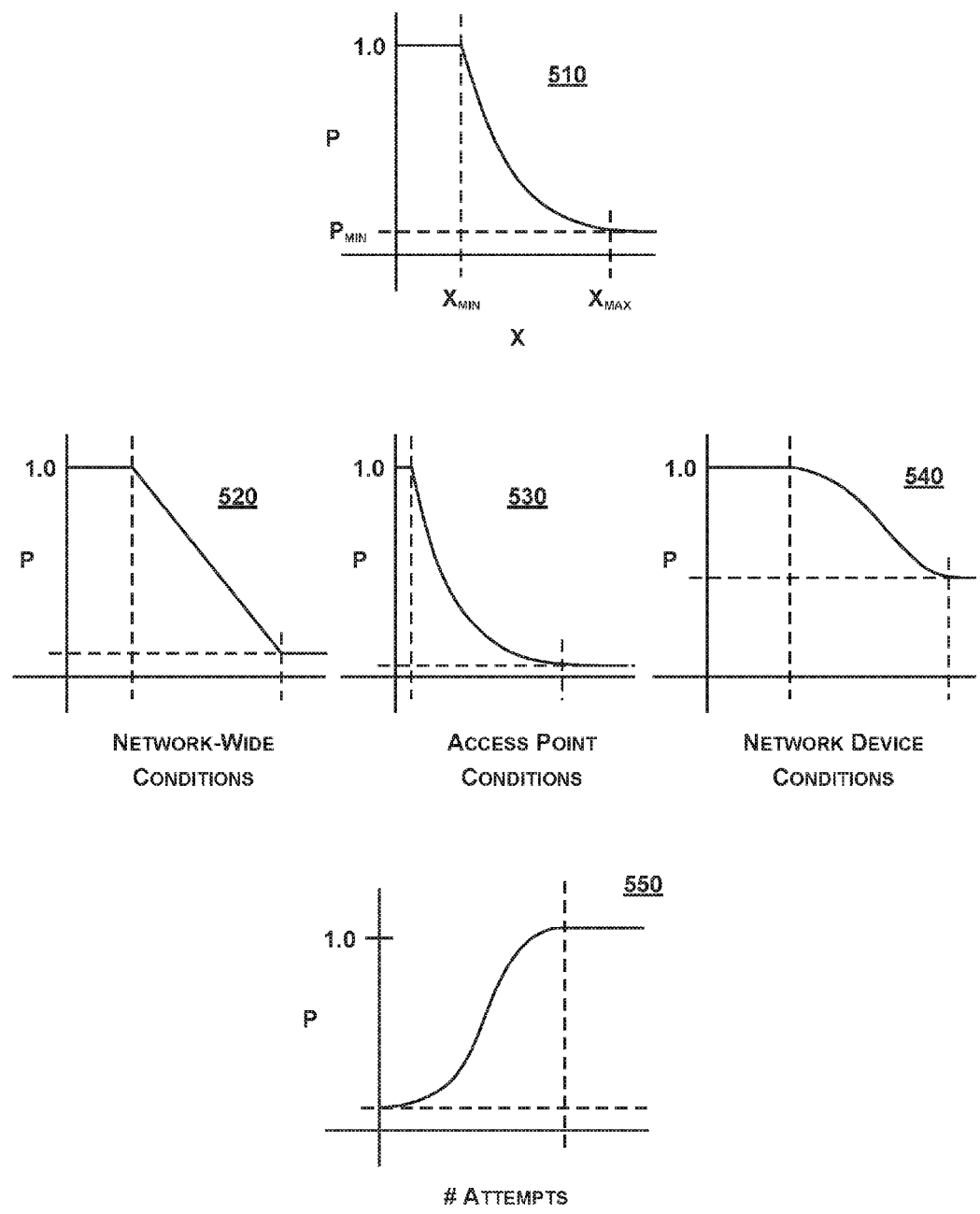
FIG. 5 is a schematic diagram illustrating an exemplary probability functions, according to one embodiment.

FIG. 4 is a block diagram illustrating the method 330 for generating the probability function based on conditions, according to one exemplary embodiment. In the example, at step 410, an initial probability function is received as shown in graph 510 of FIG. 5. The initial curve can be configured to be any type of distribution (e.g., an exponential decay curve, a partial parabolic curve, a linear curve, uniform, or a hybrid). Preferably, the probability decreases as conditions become harsher. As a result, an overburdened access point steers away new connections to those with less of a burden. Furthermore, an initial probability curve can set adjustable or non-adjustable boundaries. In particular, a Pmin (minimum probability) at an Xmax, defines a lower bound of acceptance probabilities. Moreover, an Xmin defines a guaranteed response, for conditions below the thresholds. In other words, an access point can be forced to deal with a certain amount of burdens, regardless of peripheral conditions. The initial curve can be a default curve that takes in no factors of a wireless network, or the initial curve can be preconfigured based on historical behavior of the wireless network.

At step 420, the probability function is adjusted based on network-wide conditions. Examples of network-wide conditions included total number of connections, router or switch loads, spectrum usage or capacity, time of day and day of the week. As illustrated by graph 520 a network-wide conditions probability curve can be combined with the initial curve such that the x-access includes more than one variable (i.e., default values and network-wide conditions. The graph 520 includes a probability curve that decrease linearly with an increase in burden. In one embodiment, the network-wide conditions curve (or other condition curve) can be the initial curve.

At step 430, the probability function is adjusted based on access point conditions. Examples of access point conditions include number of connections, processing load, memory or cache availability, current packet loss, time of day and day of the week. Graph 530 shows a probability curve with exponential decay in which an access point burden has an increasing effect on probability value.

At step 440, the probability function is adjusted based on network device conditions. Examples of access point conditions include RSSI, flight time of packets, number of connection requests, device user, and connection history. The connection history can be positive in that if a network device is identified as a priority device, a favorable probability function can be generated, or even bypassed. On the other hand, a negative connection history can result from, for example, a network device associated with malicious activity.

Graph 540 illustrates a probability curve with an inverse exponential decay. Further, the boundaries of guaranteed service are set high. Consequentially, conditions of a network device has a relatively smaller effect on probability value.

At step 450, the probability function is adjusted based on a number of connection attempts. Graph 550 illustrates how probability value increases along with the number attempts. The affect increases with the number of attempts to give priority for more persistent or longer waiting network devices. In some embodiments, connection attempts of a single networked device are tracked relative to connection probabilities. However, the access point may be the only available access point covering a particular area, or may be the only access point available to accept connections, making the probabilistic approach less valuable. Therefore, in other embodiments, connection attempts of several networked devices are tracked with the possibility of continually lowering a bypass threshold for automatically allowing a connection.

At step 460, the final probability function is output. The output can consist of one or more curves expressed as a formula or probability value.

One of ordinary skill in the art will recognize the myriad of probability curves, boundaries, types of conditions, combinations of conditions (and corresponding weighting of conditions) that are possible, given the disclosure herein.

Generic Computing Device (FIG. 6)

FIG. 6 is a block diagram illustrating an exemplary computing device 600 for use in the system 100A of FIG. 1, according to one embodiment. The computing device 600 is an exemplary device that is implementable for each of the components of the system 100, including the network device 110, and the access point 120. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a storage device 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications or access points as illustrated in FIGS. 1B and 1C. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage device 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point in a wireless network for steering connection requests from network devices to a preferred access point of a wireless network, comprising:

connecting to the wireless network;

receiving a probe request for connection from a network device;

responsive to the probe request, generating a probability function that defines a likelihood of granting the network device a connection;

responsive to receiving one or more subsequent probe requests, applying a progressively less restrictive probability function, wherein the probability function comprise a set of probability curves; and sending the probe response to the probe request and the one or more subsequent probe requests to the network device.

2. The method of claim 1, wherein the step of measuring the condition comprises:

responsive to the probe request, measuring the condition associated with the network.

3. The method of claim 1, wherein the condition comprises at least one of: total number of connections, router or switch loads, time of day, and spectrum usage or capacity.

4. The method of claim 1, further comprising:

measuring an input condition, wherein applying the probability function to determine a response to the probe request comprises using the input condition as an input and receiving a probability value as an output.

5. The method of claim 1, wherein the condition comprises a network device condition affecting the probability function comprise at least one of an RSSI (Received Signal Strength Indicator), and a connection history.

6. The method of claim 1, wherein the probability function is also based on system-wide conditions affecting the probability function and comprise at least one of total number of connections, router or switch loads, spectrum usage or capacity, time of day and day of the week.

7. The method of claim 1, further comprising:

receiving system-wide conditions from a controller that is in communication with other access points on the wireless network.

8. The method of claim 1, further comprising:

generating the probability function, wherein the probability function comprises a probability curve as a sliding scale having a higher probability for favorable local or network device conditions and a lower probability of less favorable local or network device conditions.

9. The method of claim 8, wherein the probability function is generated at a controller that is in communication with a plurality of access points, wherein the probability function is also based on system-wide conditions.

10. The method of claim 8, wherein generating the probability function comprises:

generating the probability function at the access point that is in communication with other access points of the wireless network, wherein the probability function is also based on system-wide conditions.

11. The method of claim 8, wherein generating the probability function comprises:

generating the probability function at the access point that is not in communication with other access points of the wireless network.

12. The method of claim 1, further comprising:

responsive to receiving a preconfigured number of the one or more subsequent probe requests from the network device, bypassing application of the probability function to allow the connection.

13. The method of claim 1, wherein the network device complies with a wireless protocol allowing the network device to select an access point for connecting to the wireless network.

14. The method of claim 1, wherein the wireless network comprises an IEEE 802.11 type of network.

15. The method of claim 1, further comprising:
prior to receiving the connection request, broadcasting a beacon that is received by the network device.

16. The method of claim 1, further comprising:
wherein sending the probe response to the network device comprises denying the connection request;
in response to the denial, receiving a probe request for connection from the network device, at a second access point;
receiving a second probability function that defines a likelihood of granting the network device a connection, the probability function based on at least one of local conditions and network device conditions;
applying the second probability function to determine a second response to the probe request; and
sending the second probe response to the network device.

17. An access point in a wireless network for steering connection requests from network devices to a preferred access point of a wireless network, the access point comprising:
a processor; and
a memory, storing:
a first module to connect to the wireless network;
a second module to receive a probe request for connection from a network device;
third module, responsive to the probe request, to generate a probability function that defines a likelihood of granting the network device a connection;
a fourth module, responsive to receiving a subsequent probe request, to apply a progressively less restrictive probability function, wherein the probability function comprise a set of probability curves; and
a fifth module to send the probe response to the probe request and the one or more subsequent probe requests to the network device.

\* \* \* \* \*